C. S. PALMER.
METHOD OF MAKING HYDROGEN.
APPLICATION FILED JUNE 3, 1918.
1,403,189.
Patented Jan. 10, 1922.
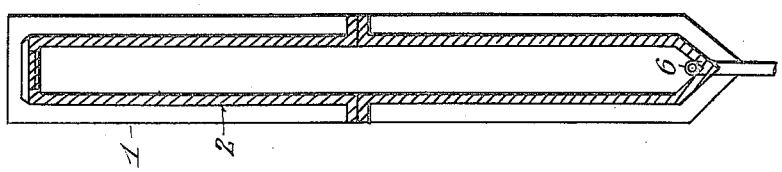
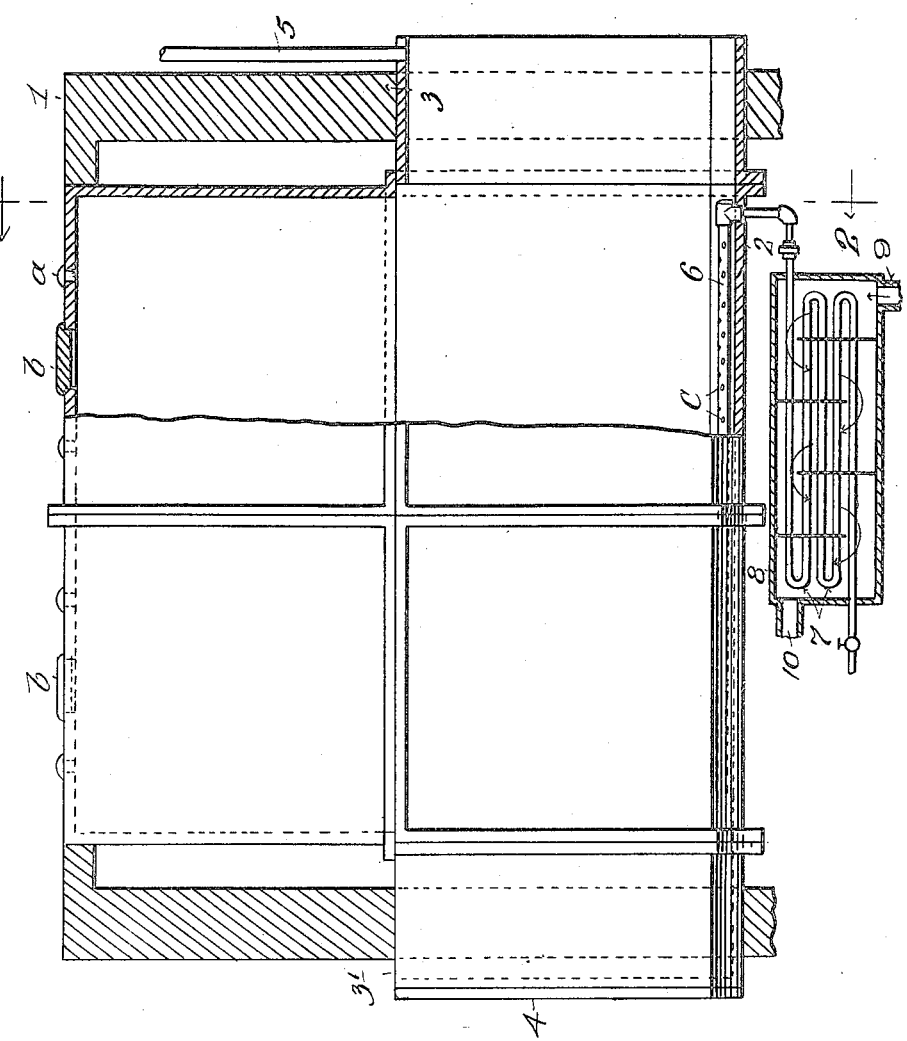
Inventor:
Charles S. Palmer,
by his attorneys Marwin Swaurton

UNITED STATES PATENT OFFICE.

CHARLES S. PALMER, OF PITTSBURGH, PENNSYLVANIA.

METHOD OF MAKING HYDROGEN.

1,403,189.   Specification of Letters Patent.   Patented Jan. 10, 1922.

Application filed June 3, 1918. Serial No. 238,021.

*To all whom it may concern:*

Be it known that I, CHARLES S. PALMER, a citizen of the United States, residing in Pittsburgh, county of Allegheny, and State of Pennsylvania, have invented certain new and useful Improvements in Methods of Making Hydrogen, of which the following is a specification.

My invention relates to improvements in the so-called Messerschmidt process for the manufacture of hydrogen gas from metallic iron and has for its objects the economical and convenient and expeditious production of such hydrogen.

My invention is fully set forth and described in the accompanying drawings and specification forming a part thereof in which—

Figure 1 is a longitudinal vertical section; and

Fig. 2 is a transverse vertical section along the line 2—2 of Fig. 1.

In the drawings the reference numeral 1 designates the fire-brick walls of the heating chamber having the usual heating flues therein and 2 designates a long narrow chamber or retort, preferably for example of about 20′ x 10′ and 8″ to 10″ wide having a V-shaped bottom, the walls being about ½ inch in thickness. The heating chamber communicates with the usual checker-work of regenerator furnaces positioned below the same (not shown). Preferably such retort is constructed in sections and the same are constructed of a highly refractory non-oxidizable metal such as ni-chrome steel, though steel or nickel may be also employed in lieu thereof. Suitable poke holes $b$ are provided at the top of the retort as shown. The lower section preferably has cast iron extensions 3, 3′ communicating with a suitable discharge reservoir for the coke residuum at the end 3 and having a suitable cast iron door 4 covering the end or extension 3′. A gas outlet conduit 3 communicates with the interior of said retort through the said end 3. In the apex of the bottom of the lower section is a longitudinal steam line 6 which has perforations $c$ at intervals along the top in order to uniformly admit steam into the bottom of the retort.

Referring to the drawings and the construction shown therein, the operation of the process is as follows:—

Sufficient iron such as it is customary to now employ in said Messerschmidt process, is introduced through the charging holes to substantially fill the entire retort.

In order to produce hydrogen from the charge the retort is first sufficiently heated by the regenerator furnace gases passing through the flues so as to maintain the mass incandescent by indirect heat only, preferably about 900° C. Steam is then introduced through the steam-line 6 in sufficient quantities to convert the incandescent iron into hydrogen according to the formula

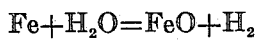

and

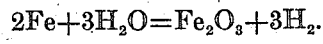

Preferably the steam is superheated, superheating being decidedly more efficient. Owing to the high heat conductivity as above stated of the thin metal walls of my retort which are preferably but ½″ in thickness and in any event less than 1½″, the process is completed very rapidly as compared with the usual procedure and the periodically injected hot blasts of gases or air are not required in order to maintain the requisite temperature for the production of hydrogen.

"Ni-chrome" and other nickelous alloys consisting principally of nickel, and even nickel itself, unlike iron, ordinarily, while difficulty oxidizable at high temperatures soon becomes superficially loaded with carbon, when subjected to direct contact with very hot reducing gases having a high carbon content, particularly at temperatures between 1000° and 1100° C. Not only is such carbon physically deposited upon and throughout the exposed surface layer of the metal as graphitic carbon, but also it will be found to be in chemical combination therewith in the form of carbides. The consequence of such loading of nickelous metal with carbon is that it rapidly deteriorates structurally, often becoming weakened to such an extent as to in many cases even crumble to pieces while being subjected to temperatures up to 1100° C., and furthermore, its specific heat conductivity becomes very greatly reduced. Under the conditions however to which the nickelous envelope is subjected during the operation of my process, the inner portion thereof is protected from the carbonizing or carbide - forming action of the reducing gases in the retort, because of the fact, as my investigations have shown, that the nickelous portion of the envelope is extremely thin and at the high temperature to which it is subjected, is at least partially pervious to the passage thereinto of the strongly oxidizing external gaseous heating medium, such as the producer-gas and hot air mixture which is preferably employed by me. The result is that the deleterious action of the carbonizing and carbide-forming gas within the retort upon the inner exposed layer of the envelope is substantially, if not entirely, prevented, and instead of the structure of the envelope being seriously weakened and the specific heat conductivity of the envelope being greatly diminished, as would ordinarily be expected by those familiar with the behavior of nickel and its alloys consisting essentially of nickel, the envelope is found to be extraordinarily durable and even after repeated operations of my process herein to retain to a remarkable degree its specific conductivity.

In view of the high conductivity of the walls of the retort and the elimination of the necessity of injecting a blast of heated air thereinto as aforesaid, I am able to obtain from the iron oxide a maximum yield of hydrogen having a minimum amount of $CO_2$ and substantially free from nitrogen, i. e., about .5% and less than 1% in all cases where the process is properly carried out.

The aforesaid "ni-chrome" alloy approximates in capacity

Ni 50 to 60%
Cr 10 to 20%
Fe 15 to 25%
balance scattering.

"Ni-chrome" alloys approximate 1200° C. melting point and is relatively non-oxidizable. Moreover, it corresponds substantially to cast iron in tensile strength, heat conductivity and co-efficient expansion.

As above stated, the crux of the invention by which I am enabled to obtain a maximum yield of hydrogen, resides in indirect heating of the reacting mass due to the fact that the non-oxidizable, highly-resistant, thin, metal walls promotes a quick and ready transfer of the large amount of heat required from the outside to the inside of the retort in which the hydrogen reaction is proceeding, whereas, were the walls constructed relatively thick, say in excess of 1½" even though they were of metal, such transfer of the necessary heat to accomplish the quick conversion of the coke or hard coal into water-gas could not be accomplished, and prolonged heating of the iron oxide by the periodic injection thereinto of hot blasts of gases or air would be necessary in order to prevent the temperature falling below the point at which the hydrogen reaction proceeds efficiently.

In my preferred process I also employ ni-chrome steel or other correspondingly high resistant non-oxidizable metal in the steam line and the superheater, since not only am I thus able to superheat the steam to the reaction temperature when desired without the destruction of the superheater, but also I avoid the inevitable reduction in temperature which occurs upon the introduction of ordinary superheated steam, since the steam issuing from my superheater usually is at a temperature considerably in excess of ordinary superheated steam, for example, from 750° C. to 1100° C., such temperatures are believed to materially promote the dissociation of the steam, thereby increasing the chemical activity of its elements with the consequence that the formation of hydrogen by the interaction of oxygen of the steam and the iron is accordingly facilitated. Such a superheater is illustrated in Fig. 1 in which a coil 7 is positioned in a superheating chamber 8, the said chamber being provided with gas inlet and outlets 9 and 10 respectively. In this construction the coil 7 and the entire steam pipe 6 are formed of ni-chrome steel, nickel steel or other suitable highly refractory, substantially non-oxidizable metal.

While nickel itself, when employed for the retort or the superheater piping, forms a thin superficial coating of nickel oxid, I have found that the formation of this crust does not seriously retard the conduction of heat therethrough and furthermore, that said crust does not increase in thickness and causes the deterioration or destruction of the retorts or superheater piping.

As is apparent from the foregoing description, the employment of a highly resistant, non-oxidizable metal retort, having walls not exceeding 1½ inches in thickness, has the following important advantages over the present Messerschmidt process as commercially practiced.

First, it enables me to maintain a substantially uniform temperature within the retort and thereby to obtain a much more economical and increased yield of gas of more uniform composition.

Second. The employment of non-oxidizable highly resistant metallic walls, which should not exceed 1½ inches in thickness, and are preferably ½ inch in thickness, as a substitute for cast iron or other oxidizable metal retorts or clay and silica retorts now used, permits of the reaction being completed in a much shorter period of time because of the reaction being continuous in but a fraction of the time required when the present retorts, which heat extremely slowly are employed.

The resultant iron oxide may be reduced by various well known methods either by means of carbon-monoxide in accordance with the formulæ

$$FeO + CO = Fe + CO_2$$

or $$Fe_2O_3 + 3CO = 2Fe + 3CO_2$$

or it may be reduced by hydrocarbons for example, according to the formula $$2FeO + CH_4 = 2Fe + 2H_2O + C.$$

It may be also reduced by carbon according to the formula $$FeO + C = CO + Fe$$
$$Fe_2O_3 + 3C = 3CO + 2Fe.$$

However, such reduction being exothermic it can be accomplished in several different forms of apparatus.

Obviously in those cases where the extension 3 is not in communication with the discharge reservoir for the coke residuum resulting from the second stage or water gas stage of the process, said extension or end 3 is closed in the same manner as extension 3' by a cast iron door (not shown).

The employment of platinum, gold, iron (and by iron I include iron having such carbon content as to come within the range commonly termed steel), as the material of the envelope referred to in the process, claims herein, or as the material of the retort referred to in the apparatus claims herein, is specifically disclaimed.

The expression "a metal associated with iron in the 'iron group'" in Mendeleef's table and of greater atomic weight than iron, referred to metals which are associated with iron in the iron group commonly known as the "iron group" consisting of iron, atomic weight 55.85, nickel, atomic weight 58.65 and cobalt, atomic weight 58.97.

Having thus described my invention, what I claim and desire to secure by Letters Patent is:—

1. In the manufacture of hydrogen gas the process which consists in confining a charge comprising a permeable mass of metallic iron in a space having an envelope which consists principally of a metal associated with iron in the "iron group" of Mendeleef's table and of greater atomic weight than iron, said envelope not exceeding 1½ inches in thickness, being of good heat conductivity and not deleteriously affected when subjected to the action of a mixture of producer gas and air heated to a temperature of 1100° C., for prolonged periods of time, supplying sufficient heat to said charge through said conductive envelope from a strongly oxidizing, highly-heated gaseous medium caused to contact with the outer surface of said envelope, to promote the hydrogen-producing reaction in said charge, maintaining said temperature by conduction of heat to said charge through said conductive envelope without the direct introduction to said chamber of substantial quantities of an air blast, simultaneously supplying a sufficient quantity of steam to said charge to effect the said reaction so as to produce a strongly, reducing, highly-heated gaseous medium in contact with a substantial portion of the inner surface of said envelope.

2. In the manufacture of hydrogen, the process which consists in confining a charge comprising a permeable mass of metallic iron particles in a space having an envelope which consists principally of a metal associated with iron in the "iron group" in Mendeleef's table and of greater atomic weight than iron, said envelope not exceeding 1½ inches in thickness, being of good heat conductivity and not deleteriously affected when subjected to the action of a mixture of producer gas and air heated to a temperature of 1100° C., for prolonged periods of time, supplying sufficient heat to said charge through said conductive envelope from a strongly, oxidizing, highly-heated gaseous medium caused to contact with the outer surface of said envelope, to promote the hydrogen-producing reaction in said charge by the oxidization of said iron, maintaining said temperature by conduction of heat to said charge through said conductive envelope without the direct introduction to said chamber of substantial quantities of an air blast, simultaneously supplying a sufficient quantity of highly superheated steam at a temperature in excess of 750° C. to said charge, to effect such reaction, so as to produce a strongly, reducing, highly-heated gaseous medium in contact with a substantial portion of the inner surface of said envelope, and the recovering the evolved gas.

3. In the manufacture of water-gas, the process which consists in confining a charge comprising metallic iron in a space having an envelope which includes a medium consisting principally of nickel, said envelope being of good heat conductivity and being sufficiently thin to be substantially penetrated into by an external strongly, oxidizing, highly-heated gaseous medium brought into contact with the outer surface of said envelope and also sufficiently thin to permit of the substantial neutralizing by said oxidizing medium of the graphite and carbide-forming tendency of a strongly reducing, highly-heated gaseous medium simultaneously brought into contact with the inner surface of said envelope said envelope being substantially non-oxidizable when subjected to the action of a mixture of producer gas and air heated to a temperature of 1100°

C., supplying sufficient heat to said charge through said conductive envelope, from a strongly oxidizing highly-heated gaseous medium caused to contact with the outer surface of said envelope, to promote the hydrogen producing reaction in said charge, maintaining said temperature by continued conduction of heat from said gaseous medium through said conductive envelope to said charge without the direct introduction into said chamber of substantial quantities of air, simultaneously supplying a sufficient quantity of steam to said charge to effect such reaction, so as to produce a strongly reducing, highly-heated, gaseous medium in contact with a substantial portion of the inner surface of said envelope and the recovering the evolved gas.

In witness whereof, I have hereunto set my hand at the city of Pittsburgh, county of Allegheny and State of Pennsylvania, this 1st day of June, 1918.

CHARLES S. PALMER.